R. W. SAMPSON.
TIRE PLUG.
APPLICATION FILED FEB. 8, 1916.
1,215,719. Patented Feb. 13, 1917.
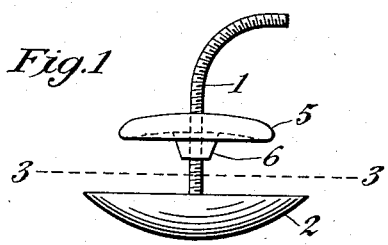
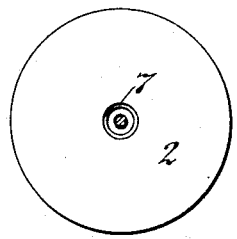
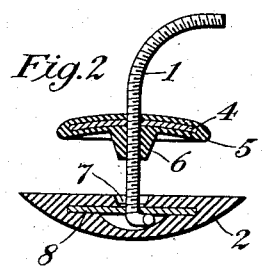
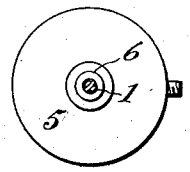
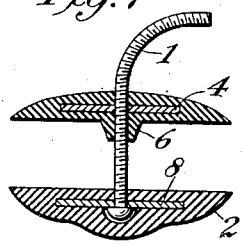
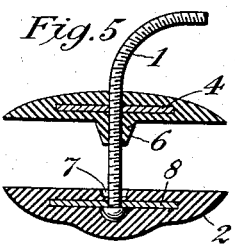
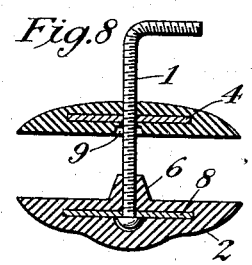
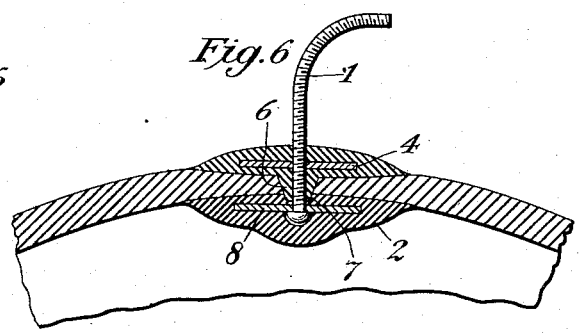
Inventor
Robert W. Sampson
By his Attorney
Andrew Wilson

UNITED STATES PATENT OFFICE.

ROBERT W. SAMPSON, OF MELBA, WHITESTONE, NEW YORK, ASSIGNOR OF ONE-HALF TO LOUIS SCHWAB, OF EAST ORANGE, NEW JERSEY.

TIRE-PLUG.

1,215,719.      Specification of Letters Patent.      Patented Feb. 13, 1917.

Application filed February 8, 1916. Serial No. 76,923.

*To all whom it may concern:*

Be it known that I, ROBERT WILLIAM SAMPSON, a subject of the King of Great Britain, residing at Melba, Whitestone, Long Island, New York, have invented certain new and useful Improvements in Tire-Plugs, of which the following is a specification.

My invention relates to improvements in that class of tire plugs which embody an inner head, an outer cap, and suitable clamping means for securing the head and cap upon opposite sides of a puncture in a pneumatic tire. And the particular object of my invention is to provide means which shall more effectually than heretofore prevent the escape of compressed air from within the tire through the puncture or along the clamping means or shank of the plug after it has been applied to a puncture.

As is well understood in the art, the successful sealing of a puncture should take place on the inside thereof. For, if this is accomplished, the compressed air within the tire will be unable to reach the puncture and to escape through it by following the clamping means, for instance, a threaded shank, up through the outer cap, or by squeezing out beneath the cap.

However, in practice, it sometimes happens that the air will work in between the head of the plug and the tire, or inner tube, until it reaches the puncture, and the air will then work its way out, gradually deflating the tire.

To overcome this difficulty, I interpose between the head and the cap, which are preferably rubber covered on their faces which engage with the tube, a sleeve-like element, of rubber, which is adapted to pass through the puncture and form a close connection between the rubber of head and the cap, helping to fill up the puncture, and surrounding the shank so that any compressed air working under the head will be prevented from reaching the shank and following its screw thread up through the cap.

In the drawings Figure 1 is an elevation of one of my improved plugs; Fig. 2 is a vertical sectional view of the same; Fig. 3 is a view taken on the line 3, 3 of Fig. 1 looking downward; Fig. 4 is a view taken on the same line and looking upward; Fig. 5 is a vertical sectional view of a modification adapted for use within punctures in inner tubes; and Fig. 6 shows the same modification applied to a section of an inner tube; Figs. 7 and 8 show other modifications; Figs. 9 and 10 are views of disconnected sealing sleeves.

In all the figures similar parts are designated by similar reference numerals.

A clamping shank 1 is connected with a head 2 either by being hinged or swiveled thereto, or both, as may be desirable with the particular class of work to which the plug is to be applied, the shank shown in Fig. 2 being swiveled and hinged, and the shank shown in Figs. 5 and 8 being swiveled only. The under side of the metal cap 4 is preferably covered with rubber 5, which may be extended also over the outer face of the cap, if that is desired. In Figs. 1, 2 and 4 I have shown a tapered sleeve 6 formed integral with the rubber coating of the cap and extending down toward the head 2 which is provided with a recess or socket 7 extending toward, but preferably not to, the plate 8 in the head 2. The parts are preferably so proportioned that when the plug is clamped into a puncture the lower end of the sleeve 6 will hit against the bottom of the recess 7 so as to compress the sleeve endwise, thereby making a close union between the rubber of the sleeve and the rubber of the head; while, at the same time, the sleeve is somewhat expanded so as to more closely fill the puncture. If this puncture is in an inner tube of a pneumatic tire, and has been cleanly cut, as for instance, by the tool of my Patent No. 1,136,977 of April 27th, 1915, it will be seen that the puncture will be very smoothly and effectually filled by the sleeve 6. And it will also be seen that, because of the close contact of the sleeve with the opposite member of the plug, any air which might work beneath the head of the plug will be prevented from reaching the threaded shank and following it out through the cap plate 4.

The form of plug shown in Figs. 1 and 2 is particularly adapted for the repair of single tube tires while the forms shown in Figs. 5 to 8, inclusive, are suitable for the repair of inner tubes, the cushioned construction of the caps making them peculiarly adapted for the repair of such inner tubes.

In Fig. 7 I have shown a modification wherein the socket 7 in the head 2 is dispensed with, the sealing operation taking place directly between the end of the sleeve 6 and the upper face of the head 2. And in Fig. 8 I have shown another modification wherein the sleeve is formed integral with the head 2 and a sleeve-receiving socket 9 is formed in the under-side of the cap. It will be understood also that the socket 9 might be dispensed with, and the sleeve 6 pressed directly against the under face of the cap. And a further modification might be made by forming the sleeve independent of both the head and the cap, as illustrated in Figs. 9 and 10, and slipping it on to the shank between them. And, under certain circumstances, this sleeve might be made of rigid or semi-rigid material which would firmly and evenly engage against the opposed faces of the head and the cap, the yielding character of which faces would permit the ends of the sleeve to embed therein. This would permit of the use of different sized sleeves for punctures of different sizes and for tires of differing thicknesses. But I prefer to make the sleeve integral with the rubber of either the head or cap; for this reduces the lines of junction between the parts and the danger of leakage, to a minimum.

Having thus described my invention what I claim and desire to secure by Letters Patent of the United States is:—

1. A tire plug embodying exterior and interior closing members presenting opposed, elastic faces, one of said closing members being provided with a centrally disposed socket, and the other of said closing members being provided with an elastic sealing element carried thereby and adapted to engage within the socket in the other sealing member, and a coöperating clamping member.

2. A tire plug embodying exterior and interior closing members, a coöperating, clamping member, and a flexible sealing member tapered toward the interior closing member and disposed between the closing members.

3. A tire plug embodying exterior and interior closing members, one thereof being provided with a centrally disposed recess, and the other closing member having an extended sealing element adapted to engage in and against the bottom of said recess, so as to form a close contact with the sides thereof, and a coöperating, clamping member.

4. A tire plug embodying exterior and interior closing members, one thereof being provided with a centrally disposed recess, and the other closing member having an extended, tapered, sealing element adapted to engage in said recess, and a coöperating, clamping member.

5. A tire plug embodying exterior and interior closing members, a laterally expansible sealing member tapered toward the interior closing member and interposed between the closing members, and a coöperating, clamping member.

ROBERT W. SAMPSON.

Witnesses:
HOWARD M. ROWE,
AGNES GERHAUSER.

Copies of this patent may be obtained for five cents each, by addressing the "Commissioner of Patents, Washington, D. C."